United States Patent
Lieske

(10) Patent No.: US 11,176,689 B2
(45) Date of Patent: Nov. 16, 2021

(54) DATA PROCESSING APPARATUS AND DATA PROCESSING METHOD

(71) Applicant: RENESAS ELECTRONICS CORPORATION, Tokyo (JP)

(72) Inventor: Hanno Lieske, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/754,345

(22) PCT Filed: Dec. 7, 2017

(86) PCT No.: PCT/JP2017/043982
§ 371 (c)(1),
(2) Date: Apr. 7, 2020

(87) PCT Pub. No.: WO2019/111371
PCT Pub. Date: Jun. 13, 2019

(65) Prior Publication Data
US 2020/0311952 A1 Oct. 1, 2020

(51) Int. Cl.
*G06T 7/269* (2017.01)
*G06T 7/246* (2017.01)
*G06F 5/01* (2006.01)

(52) U.S. Cl.
CPC .............. *G06T 7/269* (2017.01); *G06F 5/01* (2013.01); *G06T 7/246* (2017.01)

(58) Field of Classification Search
CPC .............. G06T 7/246; G06T 7/269; G06T 2207/10016; G06F 5/01; H01L 25/0652; H01L 24/16; H01L 23/481; H01L 21/4857; H01L 25/50; H01L 23/49816; H01L 21/56; H01L 2224/16146
See application file for complete search history.

(56) References Cited

U.S. PATENT DOCUMENTS

2016/0142736 A1 5/2016 Zhou
2016/0239948 A1 8/2016 Cheng et al.

OTHER PUBLICATIONS

C. Zinner et al., "An Optimized Software-Based Implementation of a Census-Based Stereo Matching Algorithm", Advances in Visual Computing, Springer Berlin-Heidelberg, Dec. 2008, pp. 216-227.

(Continued)

*Primary Examiner* — Nizar N Sivji
(74) *Attorney, Agent, or Firm* — McDermott Will & Emery LLP

(57) ABSTRACT

A first comparator compares first input data with second input data, and provides one when the first input data is larger than the second input data and zero when the first input data is equal to or smaller than the second input data as a first comparison result. A data generator generates data based on the second input data. A second comparator compares the first input data with the generated data, and provide one when the first input data is larger than the generated data and zero when the first input data is equal to or smaller than the generated data as a second comparison result. A data initializer initializes third input data. An adder adds the first and second comparison results to the third input data initialized in advance, and to provide the added data as the current third input data.

3 Claims, 5 Drawing Sheets

(56) References Cited

OTHER PUBLICATIONS

F. Stein, "Efficient Computation of Optical Flow Using the Census Transform", Electronic Publishing, Artistic Imaging, and Digital Typography; Lecture Notes in Computer Science, vol. 3175, Aug. 2004, pp. 79-86.
C. Claus et al., "High performance FPGA based optical flow calculation using the census transformation", Intelligent Vehicles Symposium, 2009 IEEE, Jun. 3, 2009, pp. 1185-1190.
J. M. Xicotencatl-Perez et al., "Real Time Stereo Vision with a modified Census transform in FPGA", Electronics, Robotics and Automotive Mechanics Conference (CERMA), 2012 IEEE Ninth, Nov. 19, 2012, pp. 89-94.
M. Kuhn et al., "Efficient ASIC implementation of a real-time depth mapping stereo vision system", Midwest Symposium on Circuits and Systems, Dec. 27-30, 2003, IEEE, vol. 3, Dec. 27, 2003, p. 1478.
W.S. Fife et al., "Improved Census Transforms for Resource-Optimized Stereo Vision", IEEE Transactions On Circuits and Systems for Video Technology, Institute of Electrical and Electronics Engineers, vol. 23, No. 1, 2013, pp. 60-73.
International Search Report issued in corresponding International Patent Application No. PCT/JP2017/043982, dated Oct. 4, 2018.
Japanese Notice of Reasons for Refusal issued in corresponding Japanese Patent Application No. 2020-521383, dated May 18, 2021, with English translation.
Notice of Reasons for Refusal issued in corresponding JP Patent Application No. 2020-521383, dated Aug. 2, 2021 w/English Translation.

DATA PROCESSING APPARATUS AND DATA PROCESSING METHOD

CROSS REFERENCE TO RELATED APPLICATIONS

This application is the U.S. National Phase under 35 U.S.C. § 371 of International Application No. PCT/JP20178/043982, filed on Dec. 7, 2017, the entire contents of each are hereby incorporated by reference.

TECHNICAL FIELD

The present invention relates to a data processing apparatus and a data processing method.

BACKGROUND ART

In many different areas including image processing, motion detection, object segmentation, or stereo disparity measurement, a so-called optical flow is used. The optical flow is a pattern of apparent motion of objects, surfaces, and edges in a visual scene caused by relative motion between an observer and a scene.

In recent years, many different algorithms for computation of the optical flow have been developed. Among those algorithms, one of important algorithms for the computation of the optical flow is based on a census transformation. The census transformation is based on a census operator that maps local neighborhood relation to a very efficient presentation. The great advantage of this transformation is robustness when working on real-world images with real-time requirements.

The census transformation that can be used for the optical flow computation has been introduced (e.g. NPTL1). The census transformation is a non-linear transformation that uses the census operator for mapping a local neighborhood surrounding pixel P to a robust string presentation. The string presentation is here ternary by setting two boundaries and specifying for each neighborhood pixel. In this presentation, it is determined whether a difference between a neighborhood pixel and a center pixel is smaller than the lower boundary, between lower and upper boundary or larger than the upper boundary.

The ternary census operator in NPTL1 will be described. Here, a "3 times 3" pixel matrix (i.e. a nine-pixel matrix) in which P1 denotes the center pixel of the matrix and P2 denotes one of surrounding pixels around the center pixel P1 will be used as an example. When a positive parameter ε denotes an allowable difference between the surrounding pixel P2 and the center pixel P1, and CENSUS denotes a census signature value, the following three equations can be specified:

$P1-P2 > \varepsilon \rightarrow CENSUS=0;$ $|P1-P2| <= \varepsilon \rightarrow CENSUS=1;$ and $P2-P1 > \varepsilon \rightarrow CENSUS=2.$ In this example, when the "3 times 3" pixels are set to {{124, 74, 32}, {124, 64, 18}, {157, 116, 84}}, the value of the center pixel P1 is 64 and each of the eight surrounding pixels around the center pixel P1 corresponds to the surrounding pixel P2. When ε=15, an output census signature value matrix would be {{2, 1, 0}, {2, x, 0}, {2, 2, 2}}. The output census signature value matrix can be also represented as a ternary census signature vector {2, 1, 0, 0, 2, 2, 2, 2}.

CITATION LIST

Non Patent Literature

NPTL 1: Stein F. (2004), "Efficient Computation of Optical Flow Using the Census Transform," in Rasmussen C. E., Bülthoff H. H., Schölkopf B., Giese M. A. (eds) Pattern Recognition. DAGM 2004. Lecture Notes in Computer Science, vol 3175. Springer, Berlin, Heidelberg.

SUMMARY OF INVENTION

Technical Problem

NPTL1 discloses the census transformation used for the optical flow presentation as described above. However, no details for implementing the census transformation are provided. Therefore, a configuration for implementing the census transformation into a processing apparatus is required.

Solution to Problem

An aspect of any one of embodiments is a data processing apparatus including: a first comparator configured to compare first input data with second input data, and to provide one when the first input data is larger than the second input data and zero when the first input data is equal to or smaller than the second input data as a first comparison result; a data generator configured to generate data based on the second input data; a second comparator configured to compare the first input data with the generated data, and to provide one when the first input data is larger than the generated data and zero when the first input data is equal to or smaller than the generated data as a second comparison result; a data initializer configured to initialize third input data; and an adder configured to add the first comparison result and the second comparison result to the third input data initialized in advance by the data initializer, and to provide the added current output data that is used as the next third input data.

An aspect of any one of embodiments is a data processing method including: comparing first input data with second input data, and providing one when the first input data is larger than the second input data and zero when the first input data is equal to or smaller than the second input data as a first comparison result; generating data based on the second input data; comparing the first input data with the data generated based on the second input data, and providing one when the first input data is larger than the data generated based on the second input data and zero when the first input data is equal to or smaller than the generated data as a second comparison result; initializing third input data; and adding the first comparison result and the second comparison result to the third input data initialized in advance, and providing added current output data that is used as the next third input data.

Advantageous Effects of Invention

According to an aspect of any one of embodiments, it is possible to implement a census transformation in a data processing apparatus.

DESCRIPTION OF EMBODIMENTS

Figure 1:
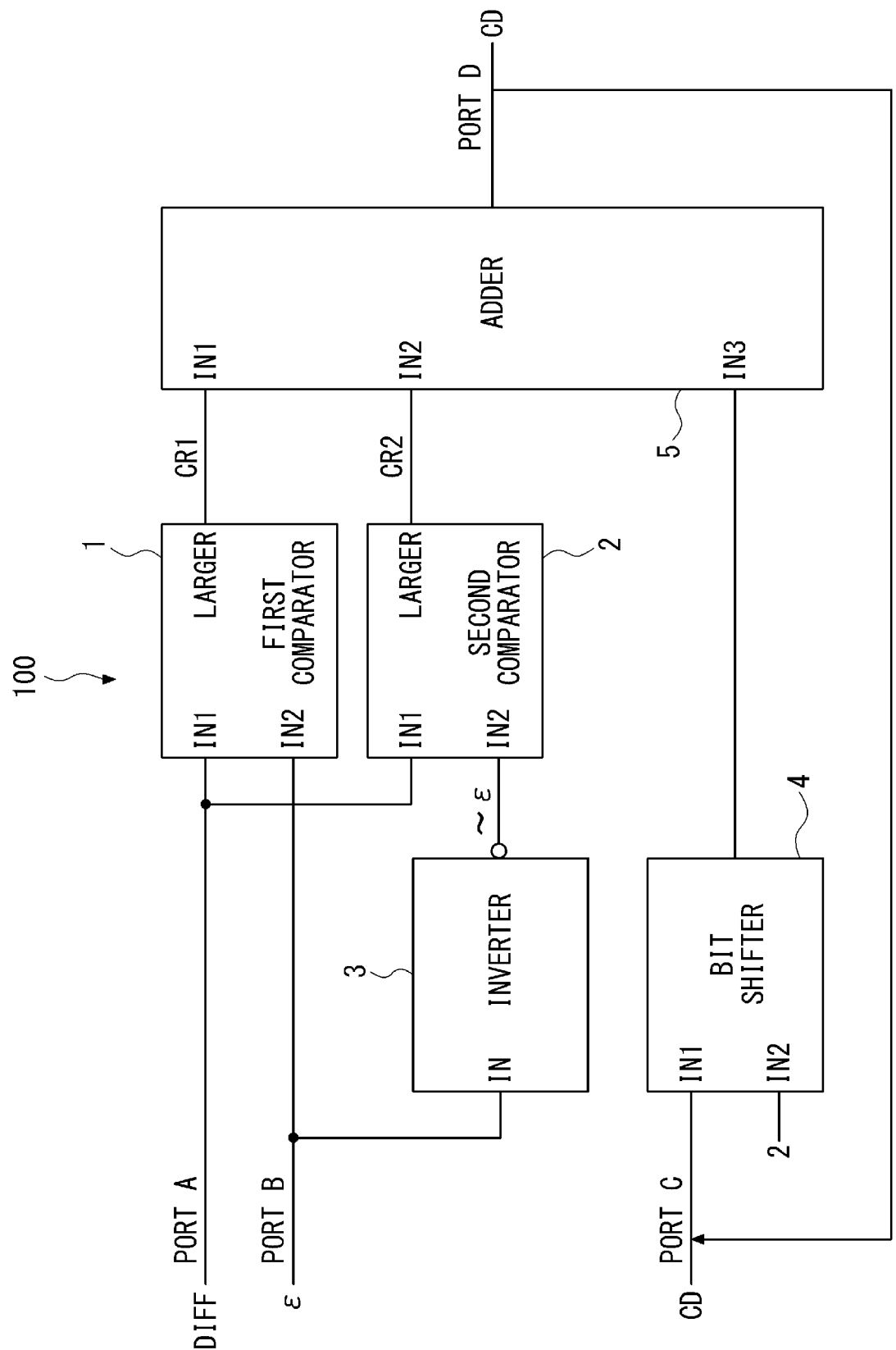
FIG. 1 schematically illustrates a configuration of a data processing apparatus according to a first embodiment.

Hereinafter, embodiments shall be explained with reference to the drawings. The same components are denoted by the same reference numerals throughout the drawings, and repeated explanations shall be omitted as necessary.

First Embodiment

Figure 2:
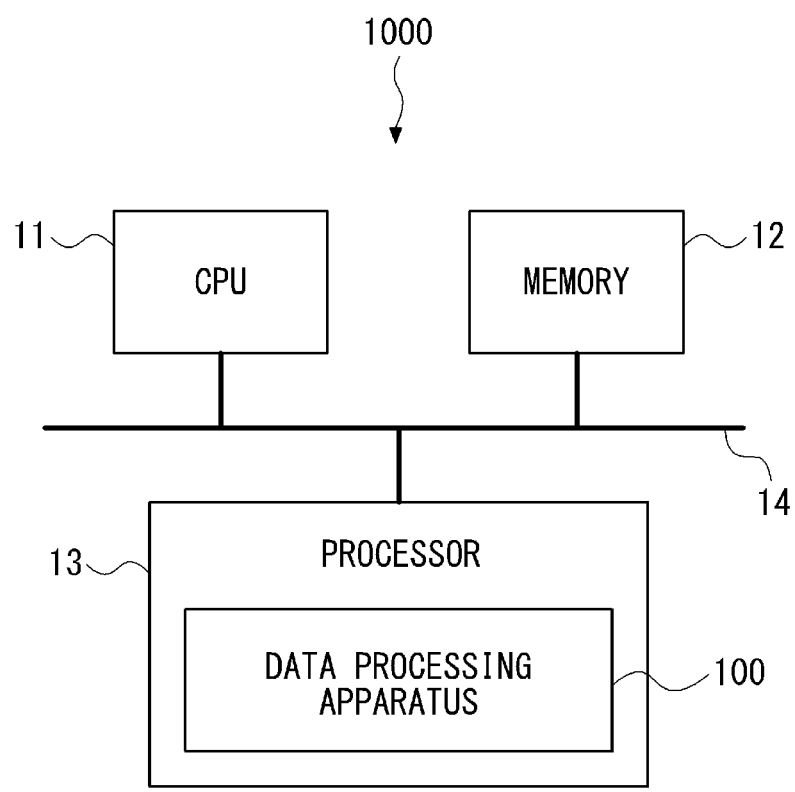
FIG. 2 illustrates implementation of the data processing apparatus according to the first embodiment in an image processing system.
Figure 3:
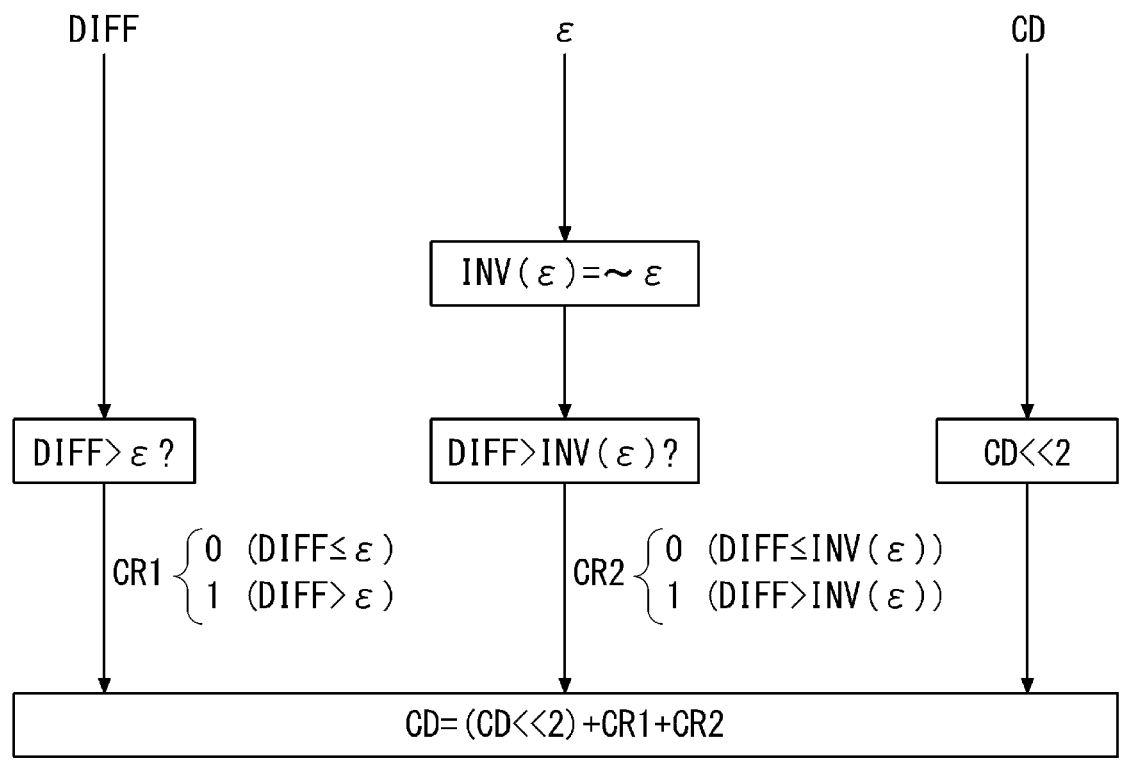
FIG. 3 illustrates a census transformation according to the first embodiment.

A data processing apparatus according to a first embodiment will be described. The data processing apparatus 100 according to the first embodiment is configured to perform a census transformation under a symmetrical boundary (threshold) setting for a so-called optical flow. FIG. 1 schematically illustrates a configuration of the data processing apparatus 100 according to the first embodiment. FIG. 2 illustrates implementation of the data processing apparatus 100 according to the first embodiment in an image processing system 1000. FIG. 3 illustrates a census transformation according to the first embodiment.

In the present embodiment, a differential value DIFF, a threshold value ε, and census data CD are provided to the data processing apparatus 100. The differential value DIFF represents a difference between a neighborhood pixel and a center pixel. As described above, a "3 times 3" pixel matrix (i.e. a nine-pixel matrix) in which P1 denotes the center pixel of the matrix and P2 denotes one of surrounding pixels around the center pixel P1 will be used. The differential value DIFF is represented by P2−P1. The threshold value ε denotes an allowable difference between the surrounding pixel P2 and the center pixel P1. The census data CD includes a census signature value CENSUS.

In this case, the differential value DIFF, the threshold value ε, and the census data CD are provided as 32-bit data. The differential value DIFF is also referred to as a first input data. The threshold value ε is also referred to as a second input data. The census data CD is also referred to as a third input data.

As illustrated in FIG. 2, the image processing system 1000 includes a central processing unit (CPU) 11, a memory 12, a processor 13, and a bus 14. The CPU 11, the memory 12, the processor 13, or the like in the image processing system 1000 are connected by the bus 14 so that those devices can communicate data, parameters, programs, algorithms, or the like therebetween. The CPU 11 performs various processing to control operations in the image processing system 1000. The memory 12 can store data, parameters, programs, algorithms, or the like, and provides those to the CPU 11, the processor 13, or the like in the image processing system 1000 according to requests from those devices.

The processing processor 13 includes the data processing apparatus 100. For example, the processor may include an arithmetic logic unit, and the data processing apparatus 100 may be included in the arithmetic logic unit.

Next, a configuration and an operation of the data processing apparatus 100 will be described with reference to FIGS. 1 and 3. The data processing apparatus 100 includes a first comparator 1, a second comparator 2, a complement generator 3, a bit shifter 4, and an adder 5.

The differential value DIFF is provided to one input of the first comparator 1 and one input of the second comparator 2 via a port A. The threshold value ε is provided to the other input of the first comparator 1 and an input of the complement generator 3 via a port B. The census data CD is provided to an input of the bit shifter 4 via a port C.

The first comparator 1 compares the differential value DIFF to the threshold value ε. When the differential value DIFF is larger than the threshold value ε, the first comparator 1 provides "1" as a comparison result CR1. When the differential value DIFF is equal to or smaller than the threshold value ε, the first comparator 1 provides "0" as the comparison result CR1.

The complement generator 3 generates a 1's complement of the threshold value ε. Here, the 1's complement of the threshold value ε, which is 32-bit value, can be represented by ~ε−1. As illustrated in FIG. 1, the complement generator 3 can be configured as an inverter. The threshold value ε is provided to the input of the inverter, and the inverter inverts each bit of the threshold value ε to provide the inverse of the threshold value (i.e. ~ε=~ε−1) that is the 1's complement of the threshold value ε. Note that the 1's complement ~ε is defined as INV(ε) in FIG. 3. The 1's complement ~ε is provided to the other input of the second comparator 2.

The second comparator 2 compares the differential value DIFF to the 1's complement ~ε. When the differential value DIFF is larger than the 1's complement ~ε, the second comparator 2 provides "1" as a comparison result CR2. When the differential value DIFF is equal to or smaller than the 1's complement ~ε, the second comparator 2 provides "0" as the comparison result CR2.

The bit shifter 4 shifts each bit of the census data CD to the left by 2 bits. For example, the bit shifter 4 may multiply the census data CD by 4 in order to shift each bit of the census data CD to the left by 2 bits. In this case, the census data CD is provided as the 32-bit data and a first bit and a second bit (i.e. the first rightmost bit and the second rightmost bit) represent the ternary census signature value CENSUS. Thus, it can be understood that the census signature value CENSUS represented by the first bit and the second bit is initialized by the 2-bit shifting described above. In other words, the census signature value CENSUS represented by the first bit and the second bit is initialized to "00" by the 2-bit shifting, and the bit shifter 4 can be understood as a data initializer that initializes the census data CD serving as the third input data in advance.

The adder 5 receives the comparison result CR1, the comparison result CR2, and the census data CD after the 2-bit shifting (or the initialization). The adder 5 adds the comparison result CR1, the comparison result CR2, and the census data CD after the bit shifting, and provides the added output data as current census data CD. In this embodiment, the current census data CD may be returned to the Port C in order to provide the census data CD for the next census transformation. In other words, the adder 5 provides the added output data as the next current census data CD (i.e. the next third input data) used for the next census transformation.

According to the configuration described above, the current census signature value CENSUS is determined as described below.

When the differential value DIFF is equal to or smaller than the 1's complement of the threshold value ε (i.e. ~ε=−ε−1), the differential value DIFF is also smaller than the threshold value ε. In this case, the first comparator 1 provides "0" as the comparison result CR1 and the second comparator 2 provides "0" as the comparison result CR2. As a result, the adder 5 provides "0" (i.e. "00" in the binary number representation) as the current census signature value CENSUS.

When the differential value DIFF is larger than the 1's complement of the threshold value ε (i.e. ~ε=−ε−1) and equal to or smaller than the threshold value ε, the first comparator 1 provides "0" as the comparison result CR1 and the second comparator 2 provides "1" as the comparison result CR2. As a result, the adder 5 provides "1" (i.e. "01" in the binary number representation) as the current census signature value CENSUS.

When the differential value DIFF is larger than the threshold value ε, the first comparator 1 provides "1" as the comparison result CR1 and the second comparator 2 provides "1" as the comparison result CR2. As a result, the adder 5 provides "2" (i.e. "10" in the binary number representation) as the current census signature value CENSUS.

As described above, the configuration capable of performing the census transformation can be implemented in various types of processor and processing apparatus such as the data processor and the image processing system described above.

Comparison Example 1

Here, a comparison example will be described to verify an advantage of the data processing apparatus 100 according to the first embodiment. When the census transformation performed by the data processing apparatus 100 is emulated, a plurality of instructions (i.e. steps or cycles) are needed to achieve the same census transformation as follows.

Here, "Pixel_diff" represents the differential value DIFF, "epsilon" represents the threshold value ε.

MOV addval, 0
INV negepsilon, 0, epsilon
CMP Pixel_diff, negepsilon
BRA notlarger, label_1
ADD addval, addval, 1
label_1: CMP Pixel_diff, epsilon
BRA notlarger, label_2
ADD addval, addval, 1
label 2: MUL result, result, 4
ADD result, result, addval When implementing this emulated version under an assumption in which one instruction consumes one cycle, ten cycles are needed to finish the same census transformation as the data processing apparatus 100.

In contrast to this, according to the data processing apparatus 100, the number of cycles can be reduced from ten to one. Therefore, a time required for completing the census transformation can be drastically reduced to one-tenth (1/10) as compared with the emulated version described above. As described above, it can be understood that the time required for completing the census transformation can be advantageously reduced according to the present configuration.

Second Embodiment

Next, a data processing apparatus according to a second embodiment will be described. The data processing apparatus 200 according to the second embodiment is configured to perform the census transformation for the optical flow under an unsymmetrical boundary (threshold) setting using a 2's complement of the threshold value ε instead of the 1's complement of the threshold value ε.

Figure 4:
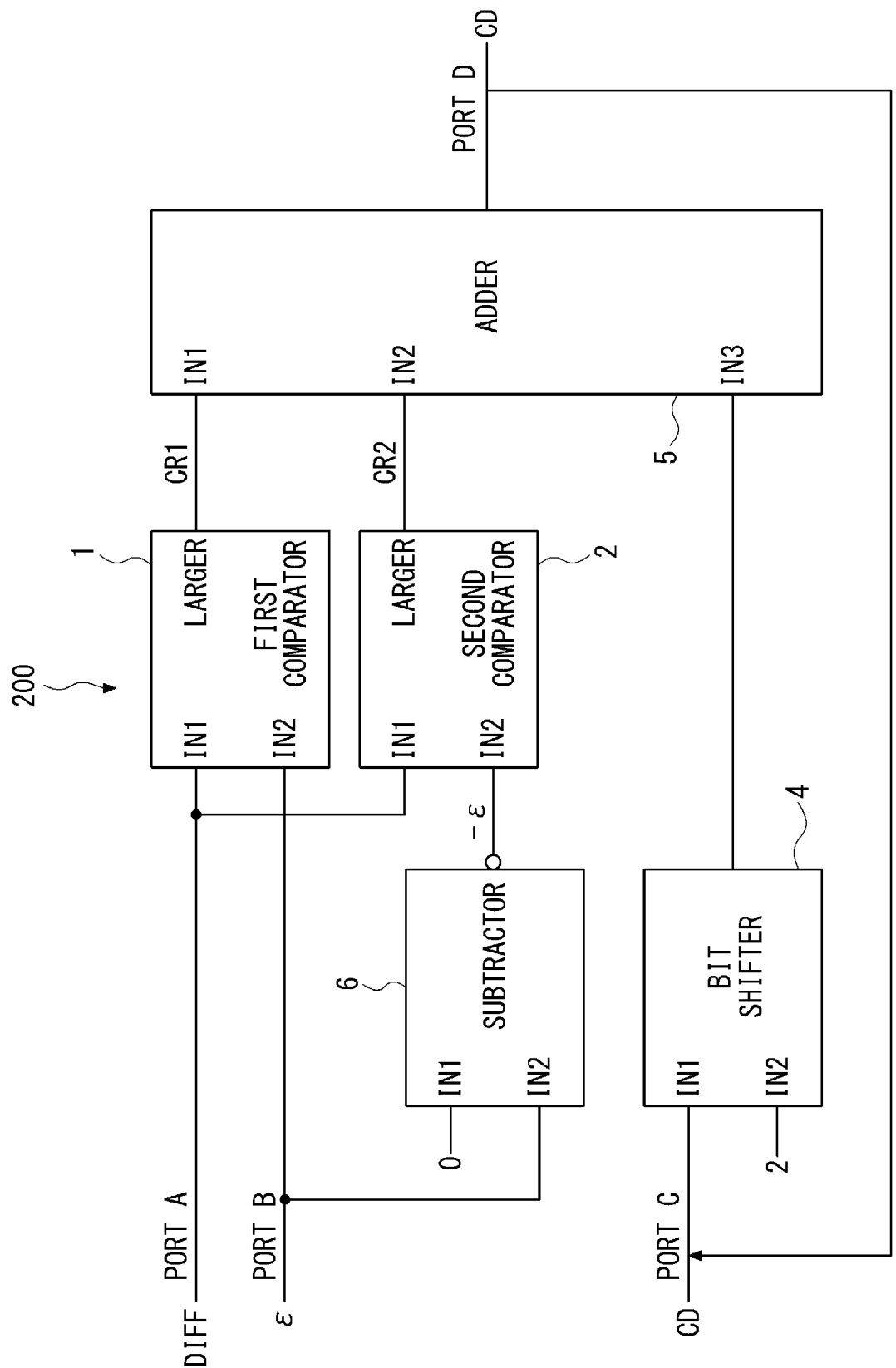
FIG. 4 schematically illustrates a configuration of a data processing apparatus according to a second embodiment.
Figure 5:
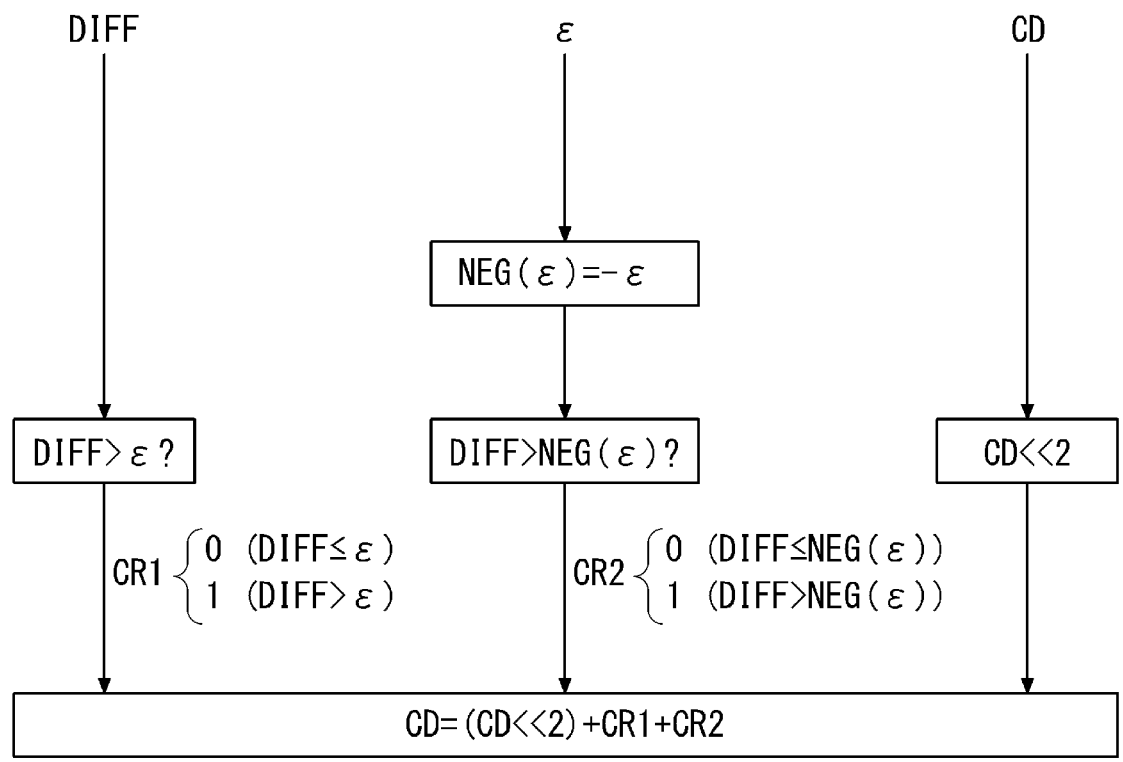
FIG. 5 illustrates a census transformation according to the second embodiment.

FIG. 4 schematically illustrates a configuration of the data processing apparatus 200 according to the second embodiment. FIG. 5 illustrates a census transformation according to the second embodiment.

The data processing apparatus 200 has a configuration in which the complement generator 3 of the data processing apparatus 100 is replaced with a complement generator 6. Because other configurations of the data processing apparatus 200 are the same as those of the data processing apparatus 100, descriptions of those will be omitted.

The complement generator 6 receives the threshold value ε and generates the 2's complement of the threshold value ε. Here, the 2's complement of the threshold value ε, which is a 32-bit value, can be represented by −ε. Note that the 2's complement −ε is defined as NEG (ε) in FIG. 5.

As shown in FIG. 4, the complement generator 6 can be configured as a subtractor. The threshold value ε is provided to one input of the subtractor, and a value of "0" is provided to the other input of the subtractor. The subtractor subtracts the threshold value ε from "0" (i.e. 0−ε) to provide the resulting value −ε that is the 2's complement of the threshold value ε.

According to the configuration described above, the current census signature value CENSUS is determined as described below.

When the differential value DIFF is equal to or smaller than the 2's complement −ε of the threshold value ε (i.e. DIFF<=−ε), the differential value DIFF is also smaller than the threshold value ε. In this case, the first comparator 1 provides "0" as the comparison result CR1 and the second comparator 2 provides "0" as the comparison result CR2. As a result, the adder 5 provides "0" (i.e. "00" in the binary number representation) as the current census signature value CENSUS.

When the differential value DIFF is larger than the 2's complement −ε of the threshold value ε and equal to or smaller than the threshold value ε (i.e. −ε<DIFF<=ε), the first comparator 1 provides "0" as the comparison result CR1 and the second comparator 2 provides "1" as the comparison result CR2. As a result, the adder 5 provides "1" (i.e. "01" in the binary number representation) as the current census signature value CENSUS.

When the differential value DIFF is larger than the threshold value ε (i.e. ε<DIFF), the first comparator 1 provides "1" as the comparison result CR1 and the second comparator 2 provides "1" as the comparison result CR2. As a result, the adder 5 provides "2" (i.e. "10" in the binary number representation) as the current census signature value CENSUS.

As described above, as in the case of the first embodiment, the configuration capable of performing the census transformation can be implemented in various types of processor and processing apparatus such as the data processor and the image processing system described above.

Comparison Example 2

Here a comparison example will be described to verify an advantage of the data processing apparatus 200 according to the second embodiment. When the census transformation performed by the data processing apparatus 200 is emulated, a plurality of instructions (i.e. steps or cycles) are needed to achieve the same census transformation as follows.

Here, as in the first embodiment, "Pixel_diff" represents the differential value DIFF, "epsilon" represents the threshold value ε.

```
      MOV addval, 0
      SUB negepsilon, 0, epsilon
      CMP Pixel_diff, negepsilon
      BRA notlarger, label_1
      ADD addval, addval, 1
label_1: CMP Pixel_diff, epsilon
      BRA notlarger, label_2
      ADD addval, addval, 1
label_2: MUL result, result, 4
      ADD result, result, addval
```

When implementing this emulated version under an assumption in which that one instruction consumes one cycle, ten cycles are needed for the data processing apparatus 200 to finish the same census transformation as in the case of the data processing apparatus 100.

In contrast to this, according to the data processing apparatus 200, the number of cycles can be reduced from ten to one. Therefore, a time required for completing the census transformation can be drastically reduced to one-tenth (1/10) as compared with the emulated version described above. As described above, it can be understood that the time required for completing the census transformation can be advantageously reduced according to the present configuration as in the case of the first embodiment.

Other Embodiments

The present invention is not limited to the embodiments described above, and can be modified as appropriate without departing from the scope of the invention. For example, in the embodiments described above, although the complement generator which is a value generator has generated the 1's or 2's complement of the threshold value ε, it is possible to adopt another value generator that generates a value other than the 1's or 2's complement based on the threshold value ε (the second input data) instead of the complement generator.

Various types of data other than the 32-bit data may be used for the differential value DIFF, the threshold value ε, and the census data CD.

In the embodiments described above, although the first comparator 1 has provided "1" as the comparison result CR1 when the differential value DIFF is larger than the threshold value ε and "0" as the comparison result CR1 when the differential value DIFF is equal to or smaller than the threshold value ε, this determination is merely an example. It should be appreciated that the first comparator 1 may provide "1" as the comparison result CR1 when the differential value DIFF is equal to or larger than the threshold value ε and "0" as the comparison result CR1 when the differential value DIFF is smaller than the threshold value ε.

In the embodiments described above, although the second comparator 2 has provided "1" as the comparison result CR2 when the differential value DIFF is larger than the 1's or 2's complement and "0" as the comparison result CR2 when the differential value DIFF is equal to or smaller than the 1's or 2's complement, this determination is merely an example. It should be appreciated that the second comparator 2 may provide "1" as the comparison result CR2 when the differential value DIFF is equal to or larger than the 1's or 2's complement and "0" as the comparison result CR2 when the differential value DIFF is smaller than the 1's or 2's complement.

REFERENCE SIGNS LIST

1 FIRST COMPARATOR
2 SECOND COMPARATOR
3 COMPLEMENT GENERATOR (INVERTER)
4 BIT SHIFTER
5 ADDER
6 COMPLEMENT GENERATOR (SUBTRACTOR)
11 CENTRAL PROCESSING UNIT (CPU)
12 MEMORY
13 PROCESSOR
14 BUS
100, 200 DATA PROCESSING APPARATUS
1000 IMAGE PROCESSING SYSTEM

The invention claimed is:

1. A data processing apparatus comprising:
a first comparator configured to compare first input data with second input data, and to provide one when the first input data is larger than the second input data and zero when the first input data is equal to or smaller than the second input data as a first comparison result wherein the first input data represents a difference generated by subtracting from a value of a first image pixel that is a center pixel in an image pixel matrix, a value of a second image pixel that is one of surrounding and neighboring pixels of the center pixel, and wherein the second input data represents a predetermined threshold value;
a data generator comprising one of (1) an inverter configured to invert the second input data to generate a 1's complement of the second input data and (2) a subtractor configured to subtract the second input data from zero to generate the 2's complement of the second input data;
a second comparator configured to compare the first input data with the data generated by the data generator, and to provide one when the first input data is larger than the data generated by the data generator and zero when the first input data is equal to or smaller than the data generated by the data generator as a second comparison result;
a bit shifter configured to initialize third input data that is census data by shifting each bit of the third input data to the left by two bits; and
an adder configured to add the first comparison result and the second comparison result to the third input data initialized in advance by the bit shifter, and to provide added current output data, as the next third input data, to an input of the bit shifter, a first bit and a second bit of the current output data representing a census signature value,
wherein the added current output data is used to calculate an optical flow.

2. The data processing apparatus according to claim 1, wherein each of the first to third input data is 32-bit data.

3. A data processing method comprising:
comparing first input data with second input data, and providing one when the first input data is larger than the second input data and zero when the first input data is equal to or smaller than the second input data as a first comparison result, wherein the first input data represents a difference generated by subtracting from a value of a first image pixel that is a center pixel in an image pixel matrix, a value of a second image pixel that is one of surrounding and neighboring pixels of the center pixel, and wherein the second input data represents a predetermined threshold value;

generating data that is one of a 1's complement and a 2's complement of the second input data;
comparing the first input data with the generated data, and providing one when the first input data is larger than the generated data and zero when the first input data is equal to or smaller than the generated data as a second comparison result;
initializing third input data that is census data by shifting each bit of the third input data to the left by two bits; and
adding the first comparison result and the second comparison result to the third input data initialized in advance, and providing added current output data, as the next third input data, to an input of the bit shifter, a first bit and a second bit of the current output data representing a census signature value,
wherein the added current output data is used to calculate an optical flow.

\* \* \* \* \*